United States Patent [19]

Furuta

[11] Patent Number: 4,562,696
[45] Date of Patent: Jan. 7, 1986

[54] FLUID PRESSURE SERVOMOTOR

[75] Inventor: Yohichi Furuta, Chiryu, Japan

[73] Assignee: Aisin Seiki Kabushiki Kaisha, Kariya, Japan

[21] Appl. No.: 203,154

[22] Filed: Nov. 3, 1980

[30] Foreign Application Priority Data

Nov. 9, 1979 [JP] Japan ................................. 54-145895

[51] Int. Cl.⁴ .............................................. F15B 9/10
[52] U.S. Cl. .................................... 60/554; 91/369 A; 91/376 R
[58] Field of Search ............. 91/369 A, 369 B, 369 R, 91/376 R; 60/547 R, 554, 552

[56] References Cited

U.S. PATENT DOCUMENTS

| | | | |
|---|---|---|---|
| 3,688,647 | 9/1972 | Kytta | 91/369 A |
| 4,173,172 | 11/1979 | Ohmi | 91/369 A |
| 4,200,029 | 4/1980 | Ohmi | 91/369 A |
| 4,227,371 | 10/1980 | Takeuchi | 91/369 B |
| 4,257,312 | 3/1981 | Ohmi | 91/369 A |

Primary Examiner—Paul E. Maslousky
Attorney, Agent, or Firm—Oblon, Fisher, Spivak, McClelland & Maier

[57] ABSTRACT

A fluid pressure servomotor for automotive vehicle wheel brake system including a housing having a movable wall therein for reciprocable movement, the movable wall dividing the housing into two compartments, one on each side of the movable wall. The two compartments cooperate to produce a pressure differential on opposite sides of the movable wall that causes the wall to be moved by the higher pressure in the direction of the lower pressure. The servomotors further have a control valve operated by the operator of the vehicle that regulates the degree of vacuum or less than atmospheric pressure established at one side of the movable wall. The movable wall is usually connected with the master cylinder of the hydraulic brake system of the motor vehicle so that when a pressure differential is effective on the movable wall and hence a power movement of the wall is produced, hydraulic fluid is displaced from the master cylinder into the hydraulic fluid brake system to apply the hydraulic brakes of the vehicle.

25 Claims, 2 Drawing Figures

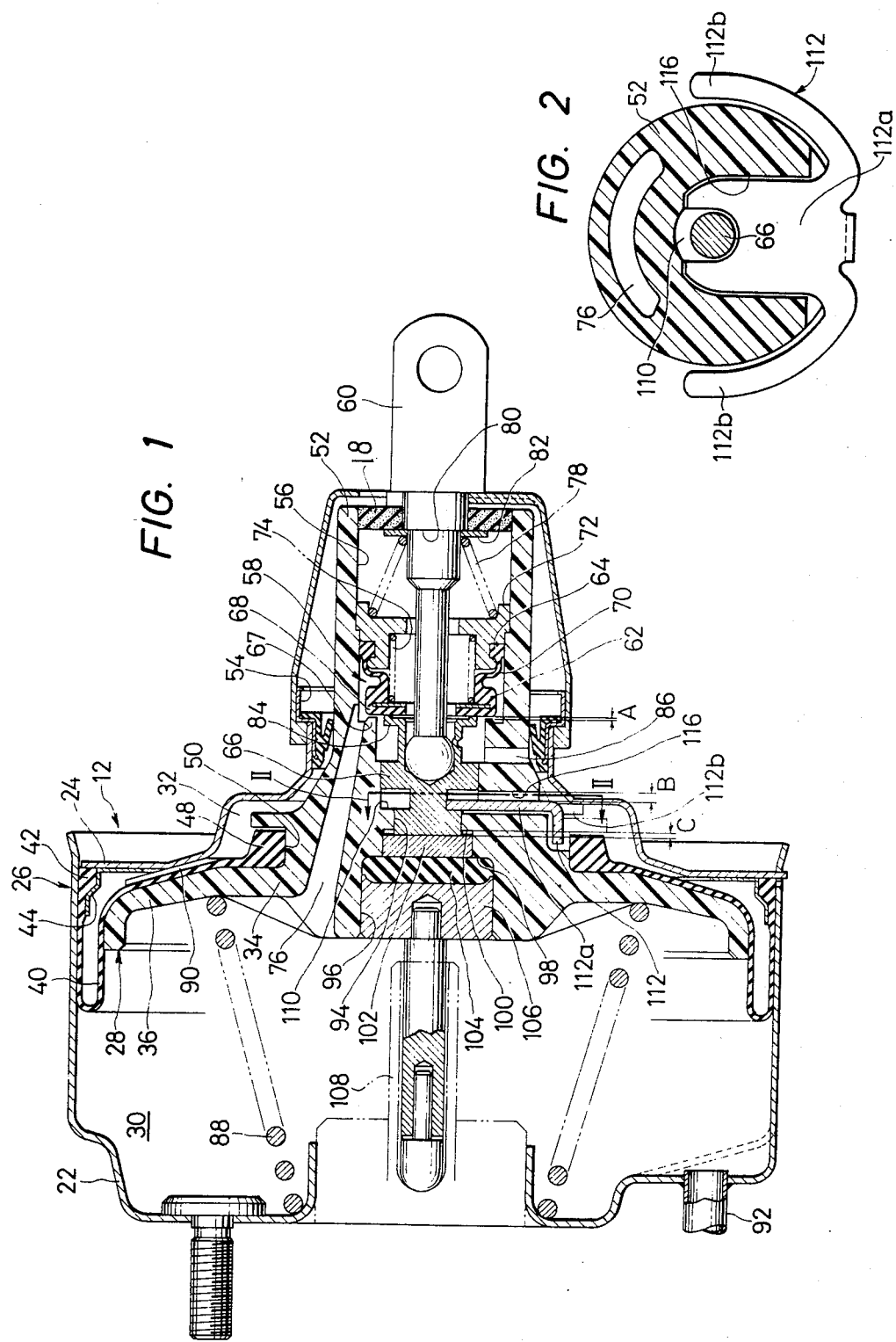

FLUID PRESSURE SERVOMOTOR

BACKGROUND OF THE INVENTION

Field of the invention

This invention relates to fluid pressure servomotors of the type used to operate power brakes and the like, and particularly to a follow-up control valve mechanism controlling operation of the servomotors.

Description of the prior art

These fluid pressure servomotors or brake booster units as they are known conventionally in the art, usually consist of a housing having a movable wall for reciprocable movement in the housing or container, the movable wall dividing the housing into two compartments, one on each side of the movable wall. The two compartments cooperate to produce a pressure differential on opposite sides of the movable wall that causes the wall to be moved by the higher pressure in the direction of the lower pressure. The servomotors further have a control valve operated by the operator of the vehicle that regulates the degree of vacuum or less than atmospheric pressure established at one side of the movable wall. The movable wall is usually connected with the master cylinder of the hydraulic brake system of the motor vehicle so that when a pressure differential is effective on the movable wall and hence a power movement of the wall is produced, hydraulic fluid is displaced from the master cylinder into the hydraulic brake system to apply the hydraulic brakes of the vehicle.

It is the desire of the designers of brake boosters for brake systems on vehicles to provide for a fluid pressure servomotor capable of suppressing the initial portion of the brake applying stroke to a possible minimum for safety purposes when the operator first moves the brake pedal to actuate the follow-up control valve mechanism for interrupting fluid communication between the both sides of the movable wall.

SUMMARY OF THE INVENTION

It is therefore the main object of the invention to provide for a fluid pressure servomotor for powered brake system of vehicles capable of suppressing the initial portion of the brake supplying stroke to a possible minimum by rapidly interrupting fluid communication between the both sides of the movable wall followed by immediate exposure to a higher pressure value on one of the sides, such as atmospheric pressure, during the brake applying stroke when the operator first moves the brake pedal to actuate the control valve mechanism of the servomotor.

With these objects and others in view, the present invention generally comprises a fluid pressure operated servomotor including a housing having a pressure differential responsive movable diaphragm-and-wall assembly operable therein, a follow-up control valve mechanism carried by the wall having one position to establish equivalent pressures on opposite sides of the wall to render the same inactive and a second position to establish differential pressures on opposite sides of the wall to render the same active to effect a force applying stroke thereby, and a spring member normally urging the wall toward abutment engagement with the housing. The control valve mechanism includes, a vacuum seat on the wall member, a movable member having a sliding fit on the wall member and operatively connected to a manually operable brake pedal, an air seat on the movable member for movement with respect to the vacuum seat, a popet valve member on the wall member spring-urged toward alternate engagement with the vacuum seat and the air seat, and a key member loose fit commonly on both of the movable member and the wall member and abuttingly engageable with the housing wall to thereby provide the one position of the follow-up control valve mechanism in a necessary minimum admitting capacity condition in order to permit communication between the both sides of the wall member followed by immediate provision of the second position of the follow-up control valve mechanism.

BRIEF DESCRIPTION OF THE DRAWING

FIG. 1 is an axial cross sectional view of a servomotor according to the invention; and FIG. 2 is a sectional view taken along the line II—II in FIG. 1.

DESCRIPTION OF THE PREFERRED EMBODIMENT

The braking device, shown in FIG. 1, has a fluid pressure servomotor 12 connected to a master cylinder (not shown) for applying the front wheel brakes and rear wheel brakes (not shown) with an operational hydraulic force in response to an input force applied to a pedal (not shown) by an operator.

The fluid pressure servomotor 12 has a first shell 22 fast to a second shell 24 by a twist lock arrangement 26. A movable wall 28 is located within the first shell 22 and the second shell 24 to form a first variable volume chamber 30 and a second variable volume chamber 32. The wall 28 has a central hub 34 with a backing plate 36 extending therefrom. A diaphragm 40 has a first bead 42 on its periphery which is held between flange 44 on the second shell 24 and the first shell 22, and a second bead 48 which is snapped onto groove 50 adjacent the backing plate 36.

The hub 34 has a rearwardly extending projection 52 which extends through opening 54 in the second shell 24. The projection 52 has an axial bore 56 into which a control valve 58 is located for supplying an operational input from a pedal (not shown) through push rod 60.

The control valve 58 has a poppet assembly 62 which is sequentially operated upon movement of plunger 66 by the push rod 60 to interrupt vacuum and allow air to develop a pressure differential across the wall 28.

The poppet assembly 62 has a face 68 separated from a fixed bead 64 by a flexible section 70. The bead 64 is retained within bore 56 by a retainer 72 which biases the bead 64 against the projection 52. A first spring 74 connected to retainer 72 urges the face 68 toward a vacuum seat 67 adjacent vacuum passage 76. The vacuum passage 76 connects the first chamber 30 with the interior of bore 56 of the hub 34. A second spring 78 located between retainer 72 and ring 82 abutting on shoulder 80 on push rod 60 urges atmospheric seat 84 on the plunger 66 into contact with face 68.

A return spring 88 located between the shell 22 and hub 34 urges bumper 90 on diaphragm 40 toward shell 24. In this position, vacuum communicated from the intake manifold through conduit 92 past a check valve (not shown) into the front chamber 30 will evacuate air from the second variable volume chamber 32 by way of passage 86 into bore 56 and out passage 76 to vacuum suspended wall 28.

The left forward end of the plunger 66 extends into an opening 94 which communicates with a reaction chamber 96. The reaction chamber 96 is of a stepped bore type to form two annular shoulders 98 and 100. Within the stepped reaction chamber 96 are captive a plate 102, a rubber-like material 104 and a head 106 of a driven member 108. The driven member 108 connects with a non-illustrated master piston of the brake master cylinder (not shown). The plate 102 is free to slide in the reaction chamber 96 and forms a clearance maked C with respect to the shoulder 100 as will be later described in greater detail.

The plunger 66 is formed with an annular groove 110 with which is engaged a forked portion 112a of a key 112. The key 112 has a pair of fingers 112b for abutment engagement with the shell 24. The projection 52 provides the passage 86 for connection of the chamber 32 with the interior of the projection 52. The forked portion 112a is an axially loose fit in a bore 116 in the projection 52 to form a clearance B between forked portion 112a and the rear face of the bore 116 in the rest position of the booster as shown in FIG. 1 and described later in greater detail.

Mode of operation of the preferred embodiment:

In the position shown, every part of the braking servomotor 12 occupies its rest position. It should be noted that in the position shown the vacuum seat 67 and the face 68 cooperate to form a small clearance shown as A while the other air seat 84 is engaging the face 68 of the poppet assembly 62 so that the chamber 32 is in communication with the other chamber 30 under the vacuum pressure, and air at atmospheric pressure present in bore 56 through a filter 18 is isolated.

When an operator applies an input force to pedal (not shown), push rod 60 will move to allow spring 74 to move face 68 of the poppet assembly 62 against vacuum seat 67 to interrupt communication between the first chamber 30 and bore 56 through passage 76. The clearance A is calculated to be the minimum which is necessary and sufficient to hold the communication between the first chamber 30 and bore 56 in the rest position. Further movement of the push rod 60 will move the atmospheric seat 84 away from face 68 to allow air at atmospheric pressure present in bore 56 to enter the rear chamber 32 through passage 86. With air in the rear chamber 32 and vacuum in the front chamber 30, a pressure differential will be created across the wall 28. This pressure differential will create an operational force which will be transmitted through the hub 34 to move the head 106 of the driven member 108 through plate 102 and rubber material 104, so that braking fluid pressure is developed in the brake master cylinder (not shown) in the ordinary manner.

It will be understood from the foregoing that the necessary minimum calculation of the clearance A is effective to provide a prompt interruption of communication between the first chamber 30 and bore 56 during the initial portion of the brake applying stroke and hence a prompt development of braking effort or better responsive character of the braking system.

In this operation, a major part of the reaction force developed in the reaction rubber material 104 is received by the shoulder 98 of the projection 52 while the remainder is received by the plate 102 and in turn received by the plunger 66 to be sensed by the operator through the push rod 60 and the brake pedal (not shown).

The clearance B is formed by the condition in which the key 112 is in abutment engagement at its fingers 112b against the internal face of the shell 24 and the left face of the annular groove 110 of the plunger 66 is spring-urged by the spring 78 toward abutment against the key in the rest position shown. The clearance B is so sized in design that the plunger 66 may forwardly move over the clearance A and in addition the atmospheric seat 84 may move away from the face 68 through a distance large enough to allow air at atmospheric pressure present in bore 56 to promptly enter the rear chamber 32. This results in a prompt development of the pressure differential across the piston 28 and hence means to attain the intended better responsive ability of the valve assembly 62 and hence the servomotor 12. Upon termination of the input force, the spring 78 will urge the atmospheric or air seat 84 against face 68 and face 68 away from the vacuum seat 67 to allow the vacuum present in chamber 30 evacuate the rear chamber 32 and again vacuum suspend the wall means 28.

In the restoring operation, the key 112 is, on the initial portion of the pedal stroke, spring urged by the spring 78 and plunger 66 to the right until the forked portion 112a abuts against the rearward face of the bore 116 so that the clearance B is eliminated, with the result that the face 68 moves away from the vacuum seat 67 by the maximum distance to thereby provide the largest section passage therethrough for promptly evacuating air in the rear chamber 32. Prompt restoring of the servomotor is thus achieved. The largest cross section passage is maintained or ensured until the key 112 abuts against the internal face of the rear shell 24 at the fingers 112b, and the wall member 28 abuts against the shell 24 at the bumper 90 immediately thereafter. The clearance B then restores its original size shown between the forked portion 112a and the rightward face of the bore 116 as shown.

The clearance C is calculated so as to provide stopper means for the plate 102 when the plunger 66 moves to the right relative to the hub 34 in the restoring operation so that overdeformation of the rubber material 104 is prevented for longer life purpose.

In the event that vacuum is not availabe and the operator is required to make a "no power" brake application, the head 106 is moved relative to the hub 34 until the right face of the annular groove 110 of plunger 66 abuts against the forked portion 112a of the key 112 and then the plunger 66 urges the hub 34 and hence the wall member 28 against the spring bias of the spring 88, pushing the driven member 108 to the left.

For completely understand the invention it may be beneficaly pointed out that the face 68 of the poppet assembly 62 and the vacuum seat 67 are located at a minimum distance necessary to maintain fluid communication under vacuum pressure when in the rest position of the servomotor 12 shown. Nevertheless, the distance is altered to a maximum when the servomotor 12 is being operated for benefically providing a prompt pressure differential across the wall member 28 or prompt evacuation of air present in the chamber 32 for restoring purpose. This is effective to increase or improve the responsive ability of the booster or servomotor 12 to the input of the operator for safety braking purpose.

What is claimed as new and desired to be secured by Letters Patent of The United States is:

1. In a braking force producing device, a fluid pressure operated servomotor including a housing, a pressure differential responsive movable wall member operable in said housing and having a retracted position, a follow-up control valve mechanism carried by said wall member and having one position to establish equivalent pressures on opposite sides of said wall member to render said wall member inactive and a second position to establish differential pressures on opposite sides of said wall member to render said wall member active to effect a force applying stroke thereby, and a spring member normally urging said wall member toward said retracted position; said follow-up control valve mechanism including a vacuum seat on said wall member, a movable member having a sliding fit in said wall member and operatively connected to a manually operable brake pedal, an air seat on said movable member for movement with respect to said vacuum seat, a poppet valve member mounted in said wall member and normally spring-urged toward alternate engagement with said vacuum seat and said air seat, and a key member loosely fit on both of said movable member and said wall member and abuttingly engageable with said housing whereby said vacuum seat and said air seat are relatively positioned when said key member is in abutting engagement against said housing such that said one position of said follow-up control valve mechanism with said vacuum seat disengaged from said poppet valve member at a minimum distance is achieved.

2. Apparatus constructed and arranged in accordance with the structure set forth in claim 1 wherein said movable member has an annular groove in an external face thereof, said wall member has a radial bore, and said key member has a forked portion and at least one finger, said forked portion being loose fit in said annular groove of said movable member and in said radial bore of said wall member so as to axially move throughout the axial lengths of said annular groove and said radial bore, respectively, said finger being disposed so as to be abuttingly engageable with an internal face of said housing.

3. Apparatus constructed and arranged in accordance with the structure set forth in claim 2 wherein said air seat is integral with said movable member and in the form of a ring, wherein a push rod is provided to operatively connect said movable member with said manually operable brake pedal, said push rod concentrically passing through said ring form air seat to be connected with said movable member at the extremity thereof, said vacuum seat also being in the form of a ring and passed through by the push rod concentrically, said poppet valve member having an annular face, an annular bead fixed to said movable wall member, a cylindrical flexible section connecting said face and said bead with each other to form a bellows-like form around said push rod, and a spring member in said poppet valve member normally spring-urging said poppet valve member toward expansion to thereby urge said annular face toward engagement with one of said vacuum seat and said air seat.

4. Apparatus constructed and arranged in accordance with the structure set forth in claim 3 wherein arrangement and disposition is so determined between said vacuum seat, said air seat and said annular groove in said movable member that in said one position of said follow-up control valve mechanism, the air seat may engage said face of said poppet valve member for closing an air passage to one side of said wall member while said vacuum seat is disengaged from said face of said poppet valve member at a necessary minimum distance to maintain fluid communication between said one of the sides of said movable wall member and the other side of said wall member, whereby a second position of said follow-up control valve mechanism may immediately follow said first position of said follow-up control valve mechanism during the minimum initial portion of the pedal stroke for actuating the apparatus, by promptly engaging said vacuum seat with said face of said poppet valve member and disengaging said air seat from said face at a larger said pedal stroke.

5. Apparatus constructed and arranged in accordance with the structure set forth in claim 4 including a driven member, a head fastened to the end of said driven member, a resilient reaction member, and a plate member, said wall member having an axial bore, said movable member being sliding fit in said axial bore, all of said head, said resilient reaction member, and said plate member being axially movably held in said axial bore in abutment engagement with each other, said plate member being normally in abutment engagement with said movable member, said driven member being in operative connection with a brake master cylinder piston.

6. In a brake force producing device, a fluid pressure operated servomotor including:
   (a) a housing;
   (b) a piston in said housing and movable between a forward and a rearward position, said piston having a cylindrical portion at the central portion thereof and extending rearwardly of said housing;
   (c) a front chamber provided in said housing and connected to a vacuum source;
   (d) a rear chamber provided in said housing rearwardly of said piston;
   (e) a push rod inserted into said cylindrical portion of said piston and operably connected to a brake pedal, whereby said push rod is forwardly movable upon depression of said brake pedal;
   (f) air valve means movably provided in said piston and engaged with a forward end of said push rod;
   (g) control valve means provided in said piston next to said air valve means for controlling communication between said front and rear chambers and communication between said rear chamber and atmospheric pressure in response to the movement of said air valve means;
   (h) an output rod operatively connected to said piston; and
   (i) a key member inserted into a radial slot provided in said piston and movable in a forward and a rearward direction in said radial slot, an inward end of said key member being engaged with an annular groove formed at the outer periphery of said air valve means and an outward end of said key member being provided with an abutting portion for limiting the position of said key member within said radial slot of said piston by engaging with and disengaging from an inside surface of a rear wall of said housing, whereby rearward movement of said air valve means relative to said piston is limited by said key member.

7. A brake force producing device as recited in claim 6 and further comprising means for limiting movement of said piston.

8. In a brake force producing device, a fluid pressure operated servomotor including:
   (a) a housing;
   (b) piston in said housing and movable between a forward and a rearward position, said piston having a cylindrical portion at the central portion thereof and extending rearwardly of said housing;

(c) a front chamber provided in said housing and connected to a vacuum source;

(d) a rear chamber provided in said housing rearwardly of said piston;

(e) a push rod inserted into said cylindrical portion of said piston and operably connected to a brake pedal, whereby said push rod is forwardly movable upon depression of said brake pedal;

(f) air valve means movably provided in said piston and engaged with a forward end of said push rod;

(g) control valve means provided in said piston next to said air valve means for controlling communication between said front and rear chambers and communication between said rear chamber and atmospheric pressure in response to the movement of said air valve means;

(h) an output rod operatively connected to said piston; and (i) a key member inserted into a radial slot provided in said piston and movable in a forward and a rearward direction in said radial slot, an inward end of said key member being operatively connected to said air valve means and an outward end of said key member being provided with an abutting portion which limits rearward movement of said air valve means when said abutting portion is in contact with a corresponding abutment means in said housing.

9. A brake force producing device as recited in claim 8 and further comprising means for limiting the movement of said piston.

10. In a pneumatic servo booster of the type including:
(a) a housing;
(b) a movable wall partitioning the interior of said housing into two chambers;
(c) a valve body connected to said movable wall; and
(d) a valve mechanism including:
   (i) a poppet valve;
   (ii) a valve seat formed on said valve body; and
   (iii) another valve seat formed on a plunger which is slidably fitted in said valve body,
(e) said valve mechanism communicating said two chambers when said poppet valve is spaced from said valve seat on said valve body and engages with said valve seat on said plunger, and
(f) said valve mechanism intercepting communication between said two chambers when said poppet valve engages with said valve seat on said valve body and is separated from said valve seat on said plunger,
the improvement comprising:
(g) return movement restricting means for restricting directly the extent of return movement of said plunger with respect to said housing when said valve body returns to its return position during return movement of said valve mechanism to a non-actuated position of the servo booster,
(h) said return movement restricting means comrpising a member which, when said servo booster is in said non-actuated position, has a first surface axially abutting said plunger and a second surface axially abutting a surface of said housing, thereby axially positioning said plunger with respect to said housing.

11. The improvement as recited in claim 10, wherein said member includes:
(a) a first portion having said second surface and
(b) a second radial portion extending into said valve body and having said first surface.

12. The improvement as recited in claim 11, wherein said first portion is a partial circumferential portion.

13. The improvement as recited in claim 11, further comprising a diaphragm:
(a) partitioning the interior of said housing into said two chambers and
(b) having a portion supporting said member.

14. The improvement as recited in claim 10, wherein said member is formed of a rigid material.

15. The improvement as recited in claim 10, further comprising a diaphragm:
(a) partitioning the interior of said housing into said two chambers and
(b) having a portion supporting said member.

16. In a brake booster comprising:
(a) a housing;
(b) a power piston;
(c) a diaphram coupled to said piston and dividing the space in said housing into front and rear power chambers located on opposite sides of said piston such that a fluid pressure differential can be created between said chambers to assist movement of said piston;
(d) an operating rod having an outer end adapted to be connected to a brake pedal and having an inner end located inside said booster
(e) first valve means for regulating communication between said power chambers in response to movement of said operating rod;
(f) a valve plunger connected to said inner end of said operating rod,
(g) said valve plunger including a head portion disposed within a recess in said power piston;
(h) said valve plunger defining second valve means for introducing an external pressure into said rear power chamber;
(i) a stopping member coupled to said valve plunger and
(j) stop means on said housing cooperable with said stopping member to stop movement thereof in a rearward direction;
(k) said stopping member being effective to establish a rearwardmost position of said valve plunger and said operating rod;
(l) such that, as said power piston is being returned to the rearwardmost position said piston assumes when said booster is in the inoperative condition, said second valve means assumes a closed position whereby application of pressure into said rear power chamber is stopped, and said first valve means is opened to place said front and rear power chambers in communication with each other, then said first valve means assumes an approximately closed position; and
(m) means for effecting continued rearward movement of said piston over a small distance relative to said valve plunger and said operating rod, which remain stationary because said stopping member is in abutment with said stop means, thereby causing said first valve means to assume said approximately closed position.

17. A brake booster according to claim 16, wherein said stopping member is an elongated flat plate having a U-shaped groove formed therein, said valve plunger being disposed at the bottom of said U-shaped groove.

18. A brake booster comprising:
   (a) a booster enclosure;
   (b) a movable operator rod adapted to transmit a braking stroke to said booster;
   (c) means for transmitting the stroke of said booster to braking means;
   (d) a power piston disposed in said enclosure in engagement at the front thereof with said booster stroke transmitting means,
   (e) said power piston having a piston head and a flexible diaphragm portion integral therewith, which diaphragm portion connects said piston head with the interior of said enclosure, thereby dividing the space within said enclosure into front and rear power chambers;
   (f) said piston also having a tubular portion which extends rearwardly from said piston head and outwardly from said rear power chamber;
   (g) said tubular portion defining a first axially rearwardly facing valve seat on the interior thereof near the front end of said tubular portion,
   (h) first passage means connecting the interior of said tubular portion at a location outwardly from said first valve seat with said front power chamber;
   (i) means defining a transverse slot to the front of and adjoining said interior of said tubular portion;
   (j) means defining a central space in said piston head to the front of and adjoining said transverse slot; and
   (k) second passage means allowing communication between a front portion of said interior of said tubular portion and said rear power chamber;
   (l) a valve plunger coaxial with said operator rod and affixed to the front end thereof,
   (m) said valve plunger comprising a plunger portion which extends into said central space of said piston head and which has a radially enlarged annular rear edge, and a valve portion adjoining said plunger portion, the rear edge of said valve portion defining a second valve seat;
   (n) a valve member coaxial with said operator rod and said tubular portion of said piston, said valve member being in sealing engagement with said tubular portion at a radially outer portion thereof and having third axial passage means extending therethrough at a radially inner portion thereof,
   (o) the front face of said valve member defining a first valve element adapted for sealing contact with said first valve seat defined by said tubular portion of said piston, thereby defining a first valve adapted to regulate communication between said first passage means in said piston and the portion of the interior of said tubular portion outwardly of said first valve,
   (p) the front face of said valve member further defining a second valve element adapted for sealing contact with said second valve seat defined by said valve portion of said valve plunger to define a second valve adapted to regulate communication between said third passage means in said valve member and the interior of said tubular portion to the front of said second valve;
   (q) stop means on the interior of said enclosure;
   (r) a stop plate disposed in said transverse slot of said piston in engagement with said valve plunger to the rear of and adjacent to said radially enlarged rear edge of said plunger portion thereof,
   (s) which stop plate acts to define a rearwardmost position of said valve plunger and operator rod when said stop plate abuts against said stop means,
   (t) such that, as said piston is being returned to the rearwardmost position said piston assumes when said booster is in the inoperative condition, said second valve assumes a closed position whereby application of pressure into said rear power chamber is stopped, and said first valve is opened to place said front and rear power chambers in communication with each other so that the pressure differential therebetween is dissipated, then said first valve assumes an approximately closed position as said piston moves through a short final distance to its rearwardmost position; and
   (u) means for effecting continued rearward movement of said piston over said short final distance while maintaining said valve plunger and operator rod stationary relative to said piston, thereby moving said first valve seat towards said first valve element so that said first valve assumes said approximately closed position.

19. A brake booster as claimed in claim 18, wherein said means for effecting continued rearward movement of said piston comprises:
   (a) said slot, in which said stop plate is disposed, is slightly wider in the axial direction of said operator rod than the thickness of said stop plate,
   (b) said difference in width corresponding to the distance said piston moves rearwardly after said valve plunger, stop plate and operator rod have reached their rearwardmost positions.

20. A brake booster as claimed in claim 18, wherein:
   (a) said stop means comprises a portion of an interior wall of said enclosure;
   (b) said valve plunger has a radially enlarged portion on the valve portion thereof; and
   (c) said stop plate is disposed between the radially enlarged edge of said plunger portion of said valve plunger and said radially enlarged portion on the valve portion of said valve plunger.

21. A brake booster as claimed in claim 16, wherein said booster further includes:
   (a) suction means provided to said first power chamber to establish low pressure therein,
   (b) such that said second valve in an open position allows atmospheric pressure to enter the front part of the interior of said tubular portion,
   (c) forward movement of said operator rod being effective to open said second valve and close said first valve,
   (d) whereby high pressure in said rear power chamber and low pressure in said front power chamber assist forward movement of said piston; and
   (e) return means effective for returning said piston, said operator rod and said valve member to their respective initial positions when said braking stroke is no longer being transmitted by said operator rod,
   (f) such that removal of said braking stroke causes said first valve to open and said second valve to close,
   (g) whereby communication is established between said front and rear power chambers such that the pressure differential therebetween is rapidly equalized and said piston thereby moves rearwardly by the action of said return means.

22. A brake booster as claimed in claim 21, wherein said stop plate is a plate having an elongated lengthwise U-shaped groove therein allowing insertion of said plate onto said valve plunger from a direction transverse to the axis of said valve plunger.

23. In a brake force producing device, a fluid pressure operated servomotor including:
   (a) a housing;
   (b) a piston in said housing and movable between a forward and a rearward position, said piston having a cylindrical portion at the central portion thereof and extending rearwardly of said housing;
   (c) a front chamber provided in said housing and connected to a source of pressure at a first value;
   (d) a rear chamber provided in said housing rearwardly of said piston;
   (e) a push rod inserted into said cylindrical portion of said piston and operably connected to a brake pedal, whereby said push rod is forwardly movable upon depression of said brake pedal;
   (f) air valve means movably provided in said piston and engaged with a forward end of said push rod;
   (g) control valve means provided in said piston next to said air valve means for controlling communication between said front and rear chambers and communication between said rear chamber and a source of pressure at a second value, higher than the first value;
   (h) an output rod operatively connected to said piston; and
   (i) a key member loosely inserted into a radial slot provided in said piston, whereby said key member is freely movable in a forward and a rearward direction in said radial slot, an inward end of said key member being operatively connected to said air valve means and an outward end of said key member being provided with an abutting portion which limits rearward movement of said air valve means when said abutting portion is in contact with a corresponding abuttment means in said housing.

24. In a pneumatic servo booster of the type including:
   (a) a housing;
   (b) a movable wall partitioning the interior of said housing into two chambers;
   (c) a valve body connected to said movable wall; and
   (d) a valve mechanism including:
      (i) a poppet valve;
      (ii) a valve seat formed on said valve body; and
      (iii) another valve seat formed on a plunger which is slidably fitted in said valve body,
   (e) said valve mechanism communicating said two chambers when said poppet valve is spaced from said valve seat on said valve body and engages with said valve seat on said plunger, and
   (f) said valve mechanism intercepting communication between said two chambers when said poppet valve engages with said valve seat on said valve body and is separated from said valve seat on said plunger,
   the improvement comprising:
   (g) return movement restricting means for restricting directly the extent of return movement of said plunger with respect to said housing when said valve body returns to its return position during return movement of said valve mechanism to a non-actuated position of the servo booster,
   (h) said return movement restricting means comprising a member which, when said servo booster is in said non-actuated position, has a first surface axially abutting said plunger and a second surface axially abutting a surface of said housing, thereby axially positioning said plunger with respect to said housing; and
   (i) a diaphragm;
      (i) partitioning the interior of said housing into said two chambers and
      (ii) having a portion supporting said member.

25. In a pneumatic servo booster of the type including:
   (a) a housing;
   (b) a movable wall partitioning the interior of said housing into two chambers;
   (c) a valve body connected to said movable wall; and
   (d) a valve mechanism including:
      (i) a poppet valve;
      (ii) a valve seat formed on said valve body; and
      (iii) another valve seat formed on a plunger which is slidably fitted in said valve body,
   (e) said valve mechanism communicating said two chambers when said poppet valve is spaced from said valve seat on said valve body and engages with said valve seat on said plunger, and
   (f) said valve mechanism intercepting communication between said two chambers when said poppet valve engages with said valve seat on said valve body and is separated from said valve seat on said plunger,
   the improvement comprising:
   (g) return movement restricting means for restricting directly the extent of return movement of said plunger with respect to said housing when said valve body returns to its return position during return movement of said valve mechanism to a non-actuated position of the servo booster,
   (h) said return movement restricting means comprising a member which, when said servo booster is in said non-actuated position, has a first surface axially abutting said plunger and a second surface axially abutting a surface of said housing, thereby axially positioning said plunger with respect to said housing;
   (i) said member includes:
      (i) a first portion having said second surface and
      (ii) a second radial portion extending into said valve body and having said first surface; and
   (j) a diaphragm;
      (i) partitioning the interior of said housing into said two chambers and
      (ii) having a portion supporting said member.

* * * * *